No. 748,807.

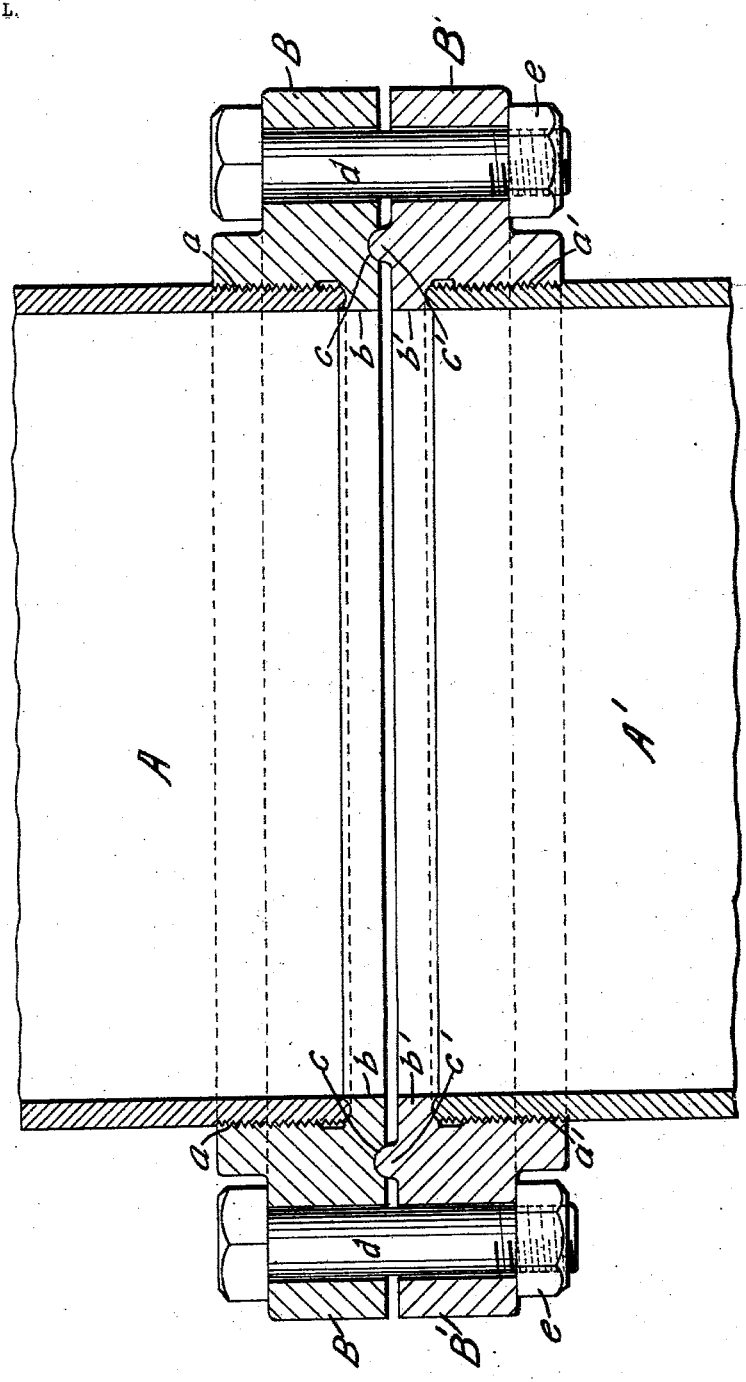

Patented January 5, 1904.

UNITED STATES PATENT OFFICE.

ALBERT SPRATT, OF PROVIDENCE, RHODE ISLAND, ASSIGNOR TO GENERAL FIRE EXTINGUISHER COMPANY, OF NEW YORK, N. Y., A CORPORATION OF NEW YORK.

PIPE JOINT OR COUPLING.

SPECIFICATION forming part of Letters Patent No. 748,807, dated January 5, 1904.

Application filed April 13, 1901. Serial No. 55,671. (No model.)

*To all whom it may concern:*

Be it known that I, ALBERT SPRATT, of the city and county of Providence and State of Rhode Island, have invented certain new and useful Improvements in Pipe Joints or Couplings; and I do hereby declare the following specification, taken in connection with the accompanying drawing, forming a part of the same, to be a full, clear, and exact description thereof.

The invention relates to a joint or coupling for metal pipes for conducting steam, water, or other fluid, and is especially adapted for use on pipes of a large size which are to be subjected to a high pressure.

The object of the present invention is to provide a simple form of coupling which will be cheap to construct, easy to connect, and when connected will form a perfectly-tight joint which will withstand great pressure.

To this end the invention consists in the novel construction, arrangement, and combination of parts, which will be hereinafter fully described, reference being had to the accompanying drawing, which is a longitudinal section of my improved pipe-coupling.

Referring to the drawing, A A' represent portions of two lengths or sections of pipe having the exterior threaded surfaces *a a'* at or near their ends. Upon the ends of each pipe are screwed the flanged collars B B', which are provided with the inward projections or flanges *b b'*, against which the ends of the pipes A A' respectively bear. The ends of the pipes and the bearing-surfaces of the inward projections or flanges are machine-made to form a perfect joint. With this construction it will be seen that it is unnecessary to make a tight joint between the collar and the pipe at the screw-threads, and consequently the pipe and flange need not be tapered, but may be made straight, and the necessity of having a perfect screw-thread is obviated. By leaving the pipe straight it will be observed that a greater area of contact will be furnished at the end of the pipe, at the same time preserving the full strength of the metal, and this area is still further increased by having the joint rounded, as shown in the drawing.

The adjacent or meeting faces of the flanged collars B B' are provided with an annular boss *c'* and a corresponding annular channel or groove *c*, respectively forming a tongue-and-groove joint between the flanges. Said tongue and groove are preferably made round in cross-section, as shown in the drawing. The flanged collars are drawn and held together in the ordinary way by means of the bolts *d* and nuts *e*, said bolts passing through holes formed in the flanges.

With the above-described construction it will be observed that the tight joint between the ends of the pipes and the inward projection or flanges protects the screw-threaded joint between the pipe and the flanged collar, and thus obviates the necessity of a tight joint at this point. As a result of this it is immaterial whether the screw-threads are perfect or not, and the end of the pipe and the collar need not be tapered, but may be left straight, and thus a very strong and tight joint is procured.

What I claim as my invention, and desire to secure by Letters Patent, is—

1. In a pipe-coupling the combination, with the end of the pipe, of a flanged collar having an inward projection to which the end of the pipe is fitted to make a tight joint.

2. In a pipe-coupling the combination, with the end of the pipe, of a flanged collar having an inward projection provided with an annular groove and to which the end of the pipe is fitted to make a tight joint.

3. In a pipe-coupling the combination, with the end of the pipe, of a flanged collar having an inward projection to which the end of the pipe is fitted, and means for forcing the end of the pipe against said inward projection to form a tight joint between the end of the pipe and the inward projection.

4. In a pipe-coupling the combination, with the ends of the pipes of two flanged collars secured thereto, said collars having inward projections to which the ends of the pipes are fitted, means for forcing the ends of the pipes against said inward projection, and means for drawing and holding said collars together.

5. In a pipe-coupling the combination, with the ends of the pipes, of two flanged collars secured thereto, said collars having inward projections to which the ends of the pipes are fitted, means for forcing the ends of the pipes against said inward projections, outward projections or flanges on said collars provided on their adjacent meeting faces with an annular boss and corresponding groove respectively and means for fastening the flanged collars together.

6. In a pipe-coupling the combination, with the ends of the pipes, of flanged collars secured thereto, said collars having inward projections provided with annular grooves to which the ends of the pipes are fitted and outward flanges provided on their adjacent meeting faces with an annular boss and corresponding groove respectively, and means for drawing and holding said flanged collars together.

ALBERT SPRATT.

Witnesses:
CHARLES W. SPRATT,
JAMES H. THURSTON.